(12) United States Patent
Norimatsu

(10) Patent No.: US 6,937,121 B2
(45) Date of Patent: Aug. 30, 2005

(54) MAGNETIC ACTUATOR

(75) Inventor: Toshihide Norimatsu, Saitama (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 19 days.

(21) Appl. No.: 10/731,630

(22) Filed: Dec. 8, 2003

(65) Prior Publication Data

US 2004/0119569 A1 Jun. 24, 2004

(30) Foreign Application Priority Data

Dec. 17, 2002 (JP) ........................................ 2002-365567

(51) Int. Cl.⁷ ............................................. H01H 51/22
(52) U.S. Cl. ........................................ 335/78; 359/220
(58) Field of Search ................................ 359/220–225; 335/78; 361/232–233

(56) References Cited

U.S. PATENT DOCUMENTS

| 5,912,608 A | * | 6/1999 | Asada | .......................... 335/222 |
| 6,108,118 A | * | 8/2000 | Minamoto | .................... 359/224 |
| 6,204,544 B1 | | 3/2001 | Wang et al. | |
| 6,765,706 B2 | * | 7/2004 | Tokuda et al. | ................ 359/220 |
| 6,819,822 B2 | * | 11/2004 | Behin et al. | .................... 385/18 |
| 2001/0021058 A1 | | 9/2001 | McClelland et al. | |
| 2002/0060830 A1 | * | 5/2002 | Miyajima et al. | ........... 359/224 |

FOREIGN PATENT DOCUMENTS

| JP | 2146143 | 6/1990 |
| JP | 6180428 | 6/1994 |
| WO | WO02/080207 | 10/2002 |

* cited by examiner

*Primary Examiner*—Lincoln Donovan
(74) *Attorney, Agent, or Firm*—David N. Lathrop, Esq.; Gallagher & Lathrop

(57) ABSTRACT

A pivotally movable member 21 comprising a substrate 22 and a frame-shaped ferromagnetic layer 23 formed on the substrate is located in a magnetic field generated by a permanent magnet 27 at oblique magnetic field position and pivotally movably supported at one end by a pair of torsion hinges 24 while a movable member 31 comprising a substrate 32 and a frame-shaped ferromagnetic layer 33 formed on the substrate 32 is driven by an electrostatic actuator 36, 37 in a direction perpendicular to a pivot axis defined by the torsion hinges 24 to move into a space between the permanent magnet 27 and the pivotally movable member 21, whereby the pivotally movable member 21 is caused to pivot by a repulsive force produced between the pivotally movable member 21 and the movable member 31.

5 Claims, 8 Drawing Sheets

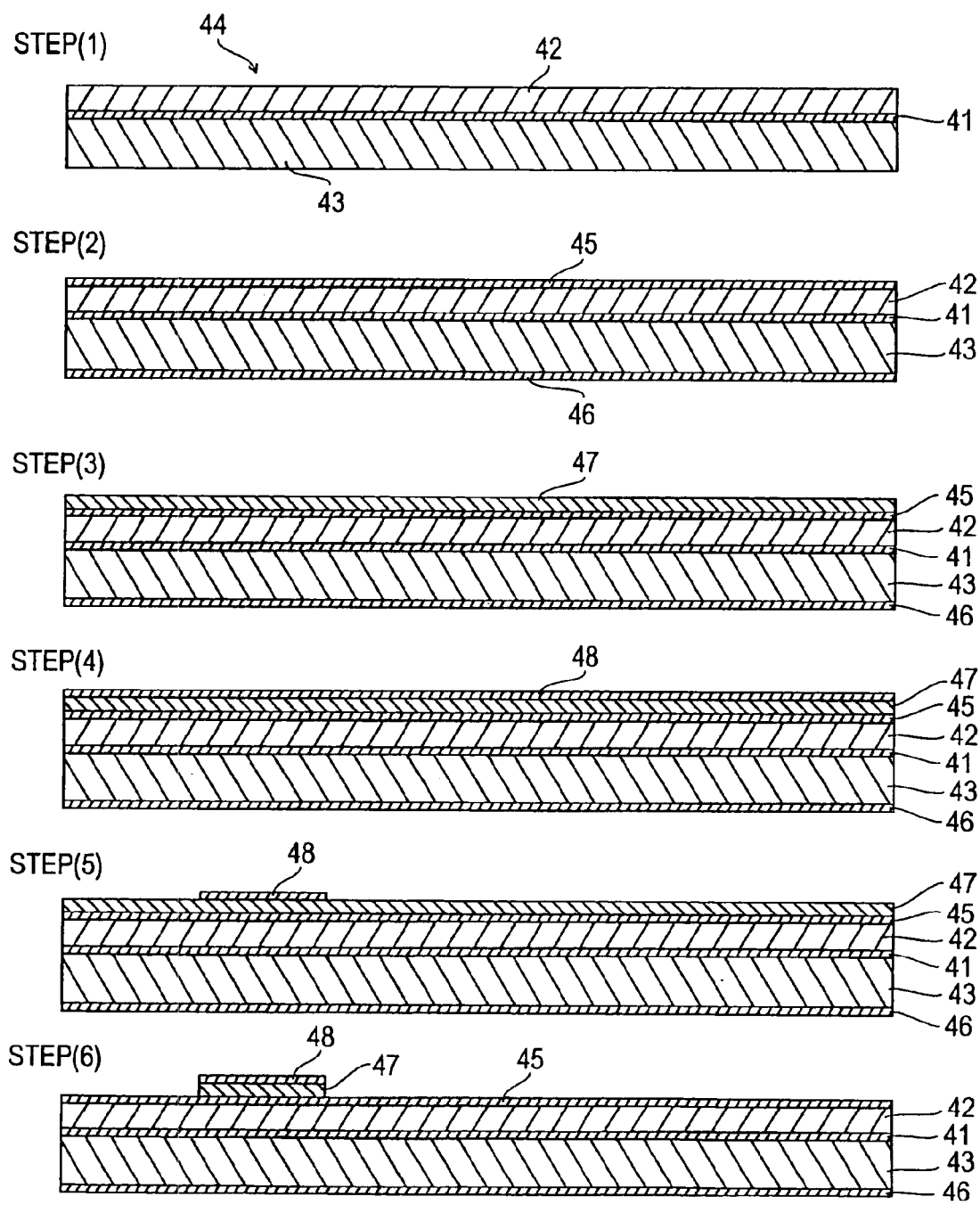

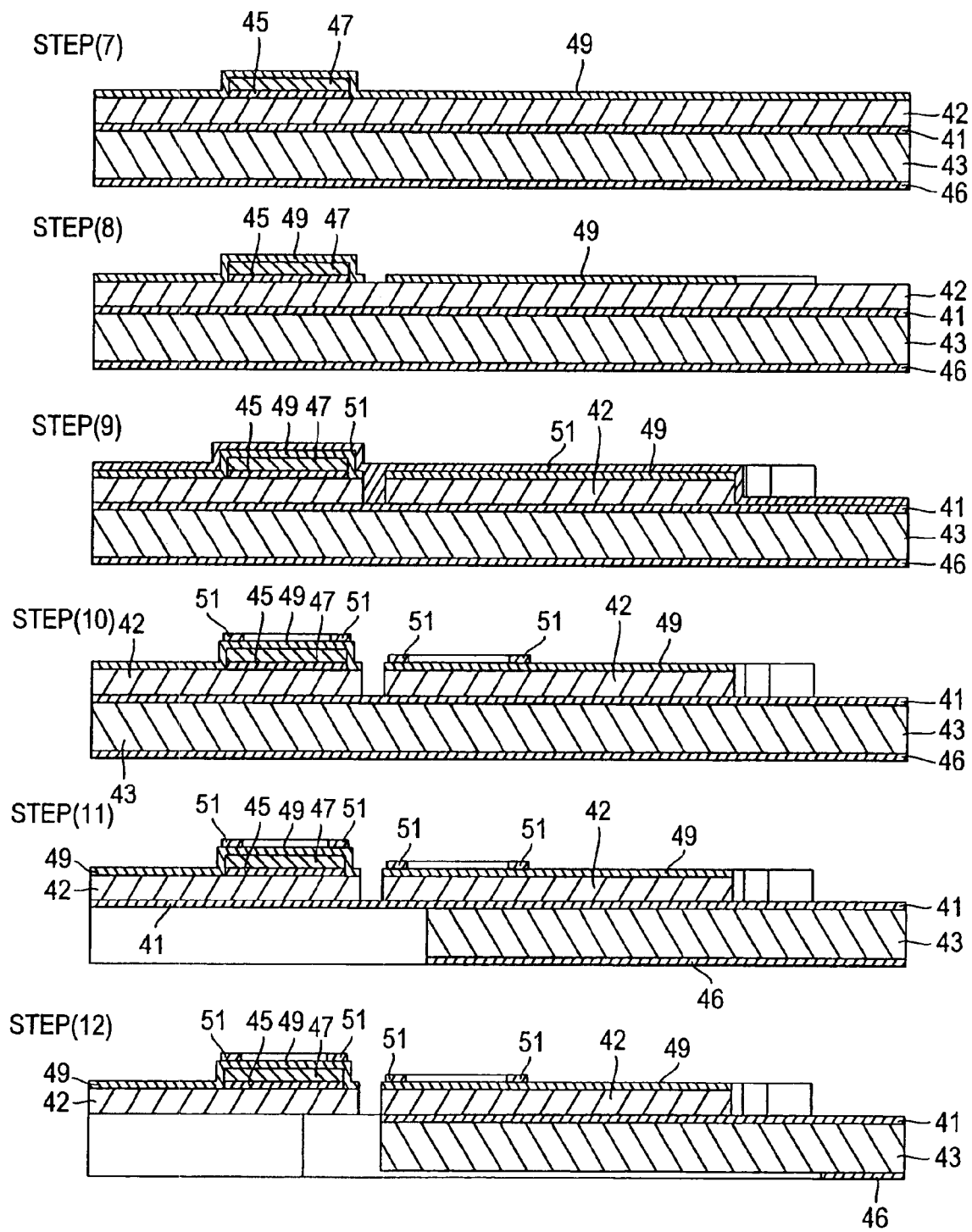

STEP(13)

STEP(14)

MAGNETIC ACTUATOR

BACKGROUND OF THE INVENTION

1. Field of the Invention

This invention relates to a magnetic actuator for use in optical scanners or the like.

2. Prior Art

FIGS. 9 and 10 illustrate an example of the construction of the prior art actuator useful in the application concerned which is manufactured utilizing silicon micromachining technique as disclosed in FIGS. 11 and 12 of Japanese Patent Application Publication No. 6-180428. This actuator comprises a frame 11, a movable board 12 located in the frame, and a pair of torsion hinges 13 supporting and mounting the movable board 12 to the frame 11, all these parts being integrally formed by etching in silicon.

The frame 11 is mounted on a substrate 15 with an insulating spacer 14 interposed therebetween, the substrate 15 being formed with a pair of fixed electrodes 16 on the surface opposing the movable board 12.

The movable board 12 acts as a movable electrode, so that upon a voltage being applied between either one of the fixed electrodes 16 and the movable board 12 through the frame 11 and the torsion hinges 13, static electricity is produced between the two to electrostatically attract the movable board 12 to the fixed electrode 16 to pivot the board about an axis defined by the pair of torsion hinges 13.

In the electrostatically operated actuator, as shown in FIGS. 9 and 10, it is to be noted that as the angle of rotation of the movable board 12 is increased, the voltage required to rotate the board is increased. In other words, a very large driving voltage is required in order to provide a large angle of rotation (angle of actuation).

In addition, since the prior art actuator is configured to apply the driving voltage to the movable board 12 itself, it presented a problem in terms of reliability in that there is a possibility of failure in operation due to displacement of the charge, for example.

SUMMARY OF THE INVENTION

This invention addresses the aforesaid prior art problems and contemplates to provide a magnetic actuator which is capable of realizing a relatively large angle of actuation with a relatively low driving voltage.

In order to solve the aforesaid problems, according to the invention set forth in claim 1, a magnetic actuator is provided which comprises a permanent magnet; a pivotally movable member located at an oblique magnetic field position offset in a direction parallel to a top surface of the permanent magnet by a predetermined horizontal distance from the center of said permanent magnet and spaced a predetermined vertical distance upwardly from the top surface of the permanent magnet within a magnetic field generated by the permanent magnet; torsion hinge means pivotally movably supporting the pivotally movable member at its one end portion adjacent the center of said permanent magnet; a movable member; and drive means for driving said movable member; wherein the movable member is driven towards the torsion hinge means in a direction orthogonal to a pivot axis defined by the torsion hinge means by the drive means to be brought in a space between the permanent magnet and the pivotally movable member; the pivotally movable member and the movable member are ferromagnetic, whereby the pivotally movable member is caused to pivot by a repulsive force produced between the pivotally movable member and the movable member as the movable member is driven to move nearer to the pivotally movable member.

According to claim 2, in the invention set forth in claim 1, each of the pivotally movable member and the movable member comprises a substrate and a ferromagnetic film formed on the surface of the substrate.

According to claim 3, in the invention set forth in claim 2, the ferromagnetic film is formed in the form of a frame on the surface of the substrate.

According to claim 4, in the invention set forth in claim 3, the ferromagnetic film in the form of a frame has its frame interrupted at one place.

According to claim 5, in the invention set forth in claim 1, the drive means is an electrostatic actuator comprising movable comb electrode means and fixed comb electrode means disposed opposite to each other.

BRIEF DESCRIPTION OF THE DRAWINGS

FIGS. 8A–8C illustrate steps (1)–(14) of a process of manufacturing the magnetic actuator shown in FIG. 1.

BEST MODES FOR CARRYING OUT THE INVENTION

An embodiment of this invention will be described below with reference to the accompanying drawings.

Figure 1:
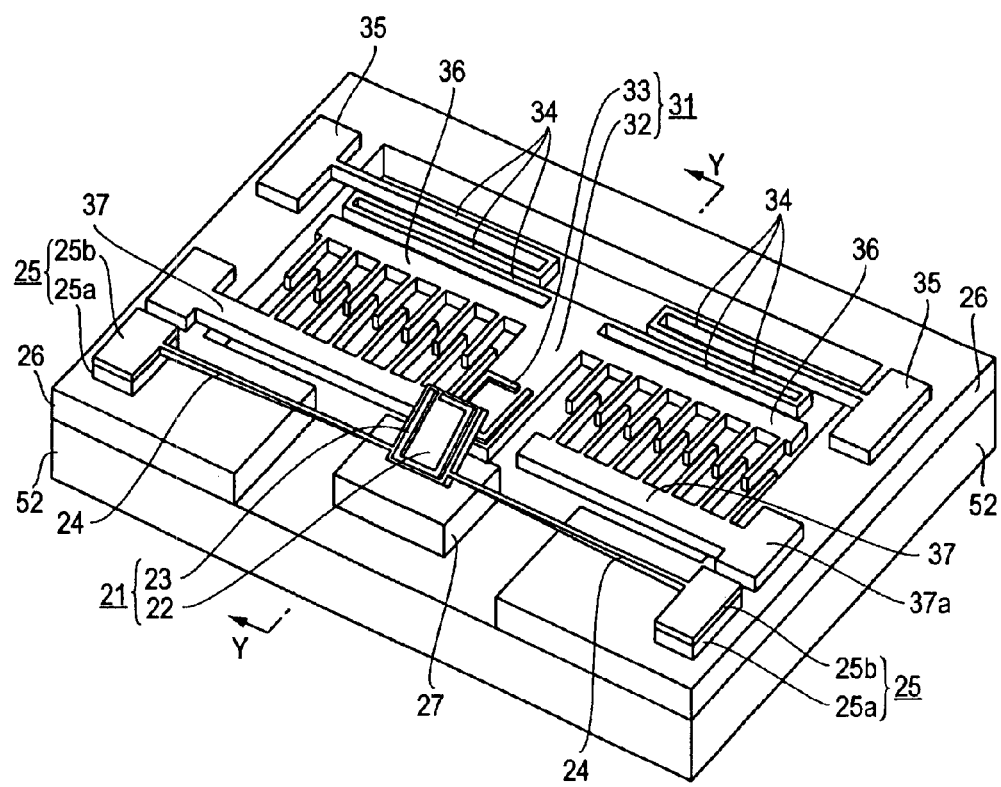
FIG. 1 is a perspective view illustrating an embodiment of the magnetic actuator according to this invention.

FIG. 1 shows an embodiment of the magnetic actuator according to this invention, and FIGS. 2–5 illustrate the principle on which this magnetic actuator works. First, the operational principle of the magnetic actuator according to this invention will be described with reference to FIGS. 2–5.

Figure 2:
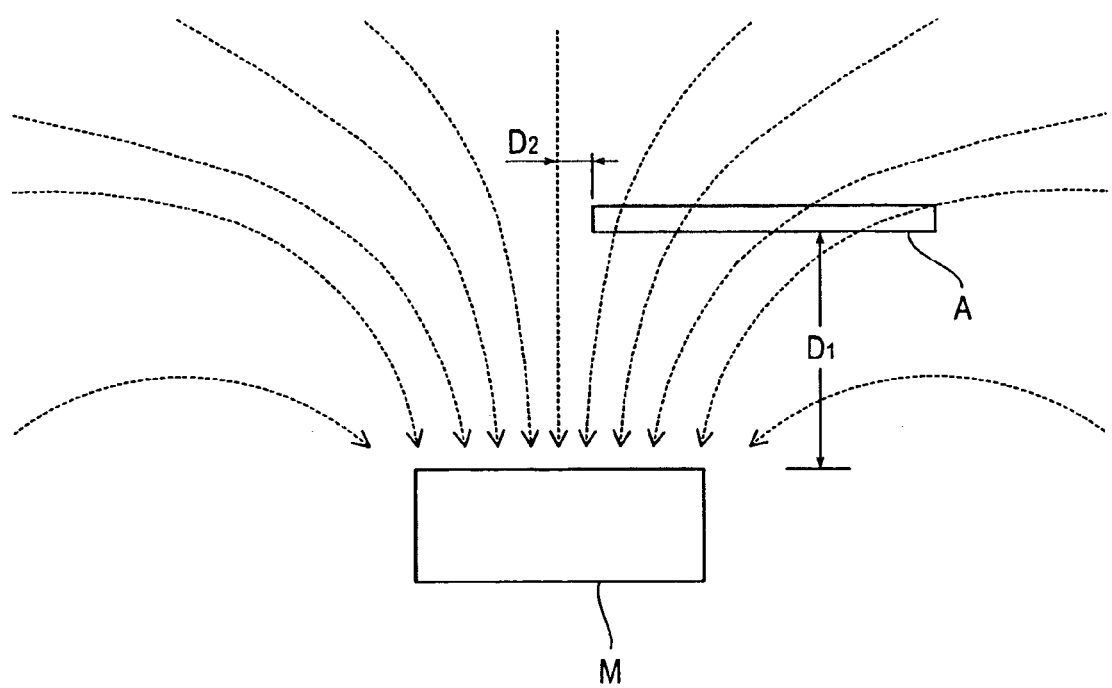
FIG. 2 is a fundamental diagram for illustrating the principle on which the magnetic actuator according to this invention works.
Figure 3:
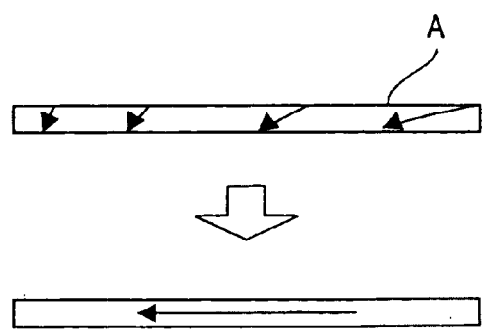
FIG. 3 shows, in the upper diagram, local magnetic moments being generated within the body of the ferromagnet bar immediately after it is inserted into the magnetic field and shows, in the lower diagram, showing the local magnetic moments augmenting each other and align in a horizontal direction (its longitudinal direction) so that the ferromagnet bar becomes a bipolar piece having a magnetic moment in a longitudinal direction.

As illustrated in FIG. 2, when a ferromagnet bar A having a sufficient thinness (say about 0.5 $\mu$m) and a sufficient width (say about 10 μm) and a sufficient length (say about 200 μm) as compared with the aforesaid width is located in the horizontal direction (parallel to the surface of a permanent magnet M) at a certain position (in which the ferromagnet bar is offset by a distance D2 in terms of its forward end from the center of magnetic field on the surface of the permanent magnet M and is spaced a distance D1 upwardly from the permanent magnet M, in other words, a position where the ferromagnet bar will be subject to a magnetic field in an oblique direction from the permanent magnet M and which will be referred to as oblique magnetic field position) within the magnetic field generated by the permanent magnet M, local magnetic moments generated within the body of the ferromagnet bar A immediately after it is inserted into the magnetic field as shown in the upper half of FIG. 3 augment each other and align in its longitudinal direction so that the ferromagnet bar A becomes a bipolar piece having a magnetic moment in the longitudinal (horizontal) direction as shown in the lower half of FIG. 3. (The ferromagnet bar A may be in the form of a frame instead of a bar, but the following explanation will continue with reference to the ferromagnet bar.)

Figure 4:
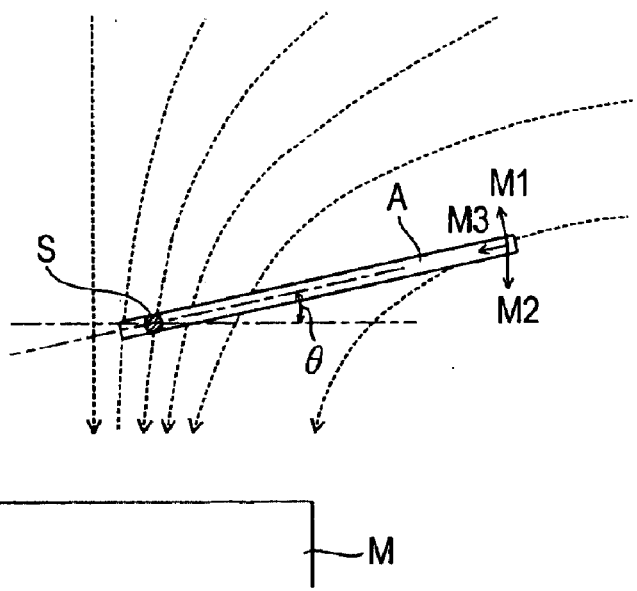
FIG. 4 is a diagram showing the ferromagnet bar coming to rest at a position where the moment of force, the gravity and the drag force of a fulcrum are in equilibrium, when the ferromagnet bar is pivotally supported on the fulcrum.

When this ferromagnet bar A is pivotally supported on a fulcrum S adjacent one end of the bar toward the center of the magnet M as shown in FIG. 4, a moment of force M1 is exerted on the ferromagnet bar in a direction tending to displace it towards an orientation parallel to a line of magnetic force passing through the fulcrum S (magnetic torque is generated). As a result, the ferromagnet bar A comes to rest at a position where the moment of force M1, the gravity M2 and the drag force M3 of the fulcrum are in equilibrium, a position (attitude), for example where it is inclined by an angle θ with respect to a plane parallel to the magnet surface as shown in FIG. 4.

Figure 5:
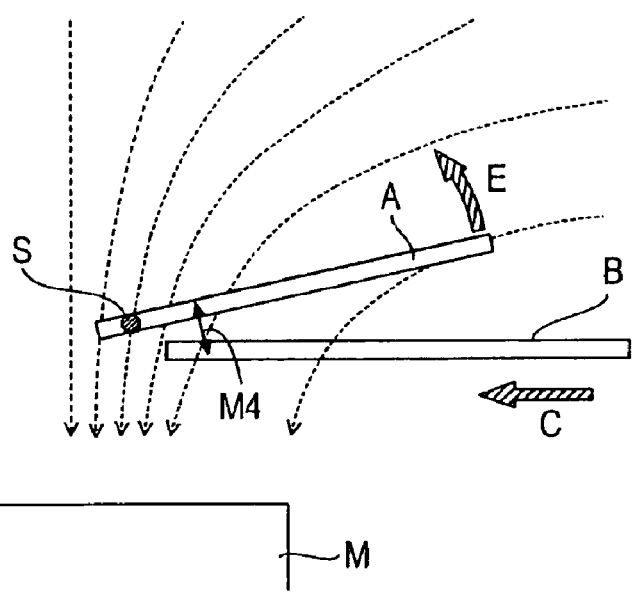
FIG. 5 is a diagram showing a second ferromagnet bar being brought into a space near to the fulcrum of the first ferromagnet bar whereupon the two ferromagnet bars will have the same polarity whereby there occurs a repulsive force between the two ferromagnet bars.

If a second ferromagnet bar B similar to the first ferromagnet bar A is moved toward the ferromagnet bar A in such a condition as shown in FIG. 4, in a direction indicated by an arrow C in FIG. 5 so as to interpose between the ferromagnet bar A and the permanent magnet M, the two ferromagnet bars A and B will have the same polarity when the second ferromagnet bar is brought near to the fulcrum S of the first ferromagnet bar A, and there occurs a repulsive force M4 (magnetic repulsion) between the two which produces a rotation moment on the first ferromagnet bar A to rotate it in the direction indicated by the arrow E in FIG. 5.

As the ferromagnet bar B is moved closer to the ferromagnet bar A, not only the repulsive force between the two ferromagnet bars is increased, but also the magnetic field is intensified, so that the magnetic flux generated within the ferromagnet bar B is intensified. Consequently, the closer the ferromagnet bar B is approaching to the ferromagnet bar A, the greater the rotation moment produced within the ferromagnet bar A is augmented to thereby enable the actuator movement with a very large angle of rotation (angle of actuation).

Figure 6:
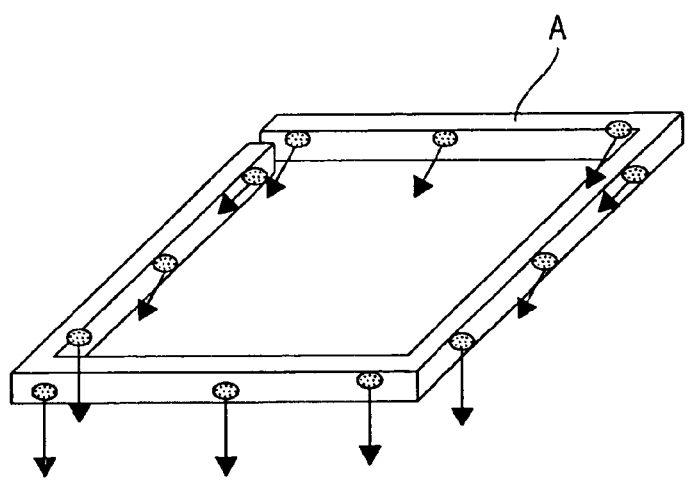
FIG. 6 is an illustration showing a preferable example of the configuration of the ferromagnet bar.

It is to be noted that while the ferromagnet bars A, B described above may be in the form of a board, it may be made in the rectangular shaped frame (ring) shown in FIG. 6 with respect to the ferromagnet frame A so as to facilitate more uniform magnetization of the ferromagnet frame in a horizontal direction.

Further, it is possible to suppress the generation of current due to changes in the magnetic field during the actuation of the ferromagnet bar A and control the resulting disturbance of the magnetic field to thereby stabilize the operation by making the ferromagnet bar in the form of a rectangular shaped loop interrupted at one place as shown in FIG. 6, instead of a closed loop.

Figure 7:
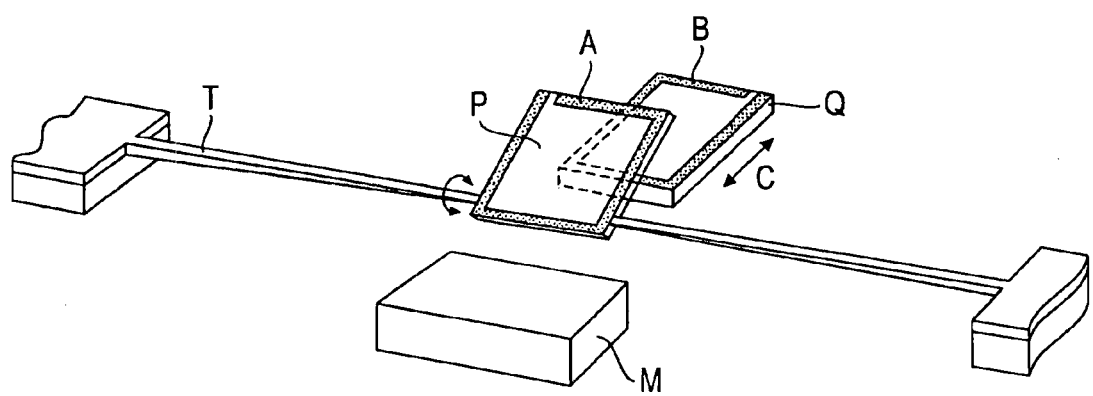
FIG. 7 is an illustration diagrammatically showing the magnetic actuator according to this invention.

FIG. 7 diagrammatically illustrates a magnetic actuator operating on the principle of operation as explained above in which the ferromagnet frames A and B are formed as interrupted frame-like members and disposed on boards P and Q, respectively. In FIG. 7, the character T indicates a torsion hinge pivotally supporting the board P.

The specific construction of the magnetic actuator according to this invention will now be described with reference to FIG. 1.

A pivotally movable member 21 in this embodiment comprises a substrate 22 in the form of a rectangular board about 200 μm square and about 3 μm thick in this example, and a ferromagnetic film 23 formed on the surface of the substrate 22, the ferromagnetic film 23 being in the form of a rectangular frame about 200 μm long, 10 μm wide and 0.5 μm thick and interrupted at one place.

The pivotally movable member 21 has a pair of torsion hinges 24 extending oppositely outwardly from the opposite sides thereof adjacent its one end closer to the center of the magnet M to pivotally movably support the pivotally movable member 21. The pair of torsion hinges 24 are formed at one ends integrally with the substrate 22 of the pivotally movable member 21 and at the other ends integrally with the upper pedestal parts 25b of the pedestal 25 which are connected to and supported by associated lower pedestal parts 25a of the pedestal 25 which are in turn secured on a base 26.

The base 26 is in the form of a rectangular frame cut away in the middle of one side thereof, and a permanent magnet 27 is disposed in the cut-away portion. The permanent magnet 27 is in the form of a rectangular block having its interior lines of magnetic force vertically running, that is, having an N pole (or S pole) on the upper surface opposing the pivotally movable member 21. The pivotally movable member 21 is located at an oblique magnetic field position within the magnetic field generated by this permanent magnet 27. It is to be understood that the oblique magnetic field position in which the pivotally movable member 21 is disposed may be appropriately determined in terms of the distances D1 and D2 depending on the relative design of the shape and size of the permanent magnet and the shape and size of the ferromagnetic film 23 of the pivotally movable member 21.

A movable member 31 driven to move into and out of a space between the permanent magnet 27 and the pivotally movable member 21 comprises a substrate 32 in the form of a rectangular board and a ferromagnetic film 33 formed on the surface of the substrate 32. Like the ferromagnetic film 23 of the pivotally movable member 21, the ferromagnetic film 33 of the movable member 31 is also in the form of a rectangular frame (same size as the ferromagnetic film 23) interrupted at one place (which is a different place than that where the ferromagnetic film 23 is interrupted). It is to be noted that the ferromagnetic film 33 is placed on the substrate 32 of the movable member 31 toward its forward end adjacent the pivotally movable member 21.

The movable member 31 has a pair of support beams 34 formed integrally with and extending in a zigzag pattern oppositely from the opposite sides thereof adjacent its rearward end, the support beams 34 having base portions 35 formed at their other ends integrally therewith. The movable member 31 is supported on the base 26 by means of the support beams 34 and base portions 35, and is adapted to be able to move towards the permanent magnet 27 because of the flexible nature of the zigzag support beams 34. The substrate 32 of the movable member 31 further has movable comb electrodes 36 formed integrally with and extending from the opposite sides thereof intermediates its opposite ends. The movable comb electrodes 36 are disposed so as to be interdigitally engageable with fixed comb electrodes 37 having base portions 37a fixed to and supported by the base 26. The movable comb electrodes 36 and the fixed comb electrodes 37 constitute an electrostatic actuator.

The movable member 31 supported as described above is driven by the electrostatic actuator, and a surface portion of the movable member 31 is preferably finished to be a mirror face so that it acts as a magnetic actuator.

In this structure, the substrate 32 of the movable member 31, the support beams 34, the base portions 35, and the movable comb electrodes 36 are formed in one piece by etching a silicon substrate, for example. The fixed comb electrodes 37 and the lower pedestal parts 25a of the pedestals 25 may also be formed from the same silicon substrate.

The substrate 22 of the pivotally movable member 21, the torsion hinges 24 and the upper pedestal parts 25b of the pedestals 25 may be integrally formed in one piece as by polysilicon film, for example. The ferromagnetic films 23, 33 may be nickel films. The base 26 may also be formed from a silicon substrate.

Although not shown in FIG. 1, it is to be noted that a layer of silicon dioxide is interposed as an electrical insulator between the base 26 and each of the pedestals 25, the base portions 37a of the fixed comb electrodes 37 and the base portions 35 of the support beams 34 which are fixed to the base 26. Likewise, a silicon dioxide layer is interposed between the lower pedestal parts 25a and the upper pedestal parts 25b of the pedestals 25. Further, the ferromagnetic films 23 and 33 are formed on the respective substrates 22 and 32 with silicon dioxide layers interposed therebetween.

In the magnetic actuator constructed as described above, the pivotally movable member 21 and the movable member 31 correspond to the ferromagnet bar A and the ferromagnet bar B, respectively of the magnetic actuator described hereinbefore with respect to the principle of operation according to this invention. More specifically, upon a voltage being applied between the movable comb electrodes 36 and the fixed comb electrodes 37, the movable comb electrodes 36 are electrostatically attracted toward the fixed comb electrodes 37 and hence the movable member 31 is driven parallel to the surface of the base 26 and from a direction orthogonal to the pivot axis of the torsion hinges 24 towards the pivot axis to be brought in a space between the permanent magnet 27 and the pivotally movable member 21 located within the magnetic field produced by the permanent magnet 27, whereby the pivotally movable member 21 is rotated by a repulsive force generated between the pivotally movable member 21 and the movable member 31.

With the magnetic actuator constructed as described above, it is to be appreciated that it is possible to impart a large driving angle (angle of rotation) to the pivotally movable member 21 by driving the movable member 31 linearly (horizontally), and that it is possible to drive the movable member 31 with a low voltage since it is driven by the comb type electrostatic actuator.

It is further to be noted that because no voltage is applied to the pivotally movable member 21, there is no risk of failure in operation due to displacement of the charge in the pivotally movable member. It should be understood that the shape and size of the movable member, particularly the shape and size of its support beams as well as the location where the support beams are formed, and the shape and size of the electrostatic actuator are not limited to the configuration as herein illustrated.

Figure 8C:
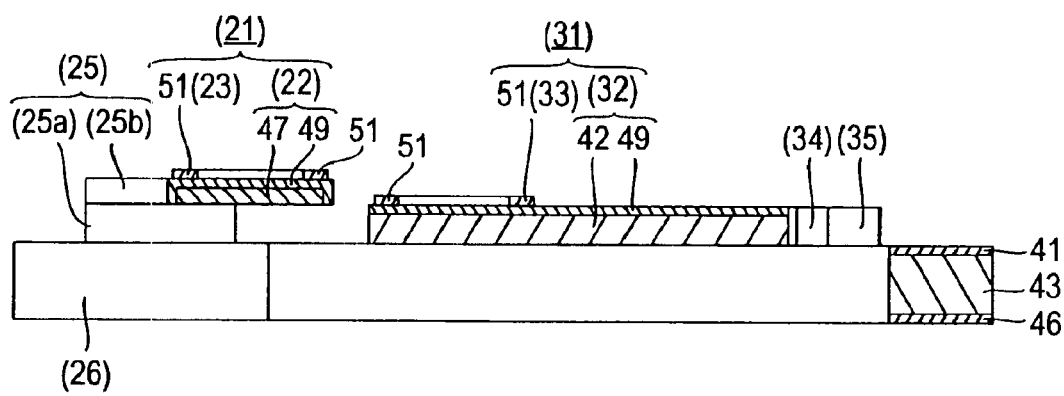
Figure 8C:
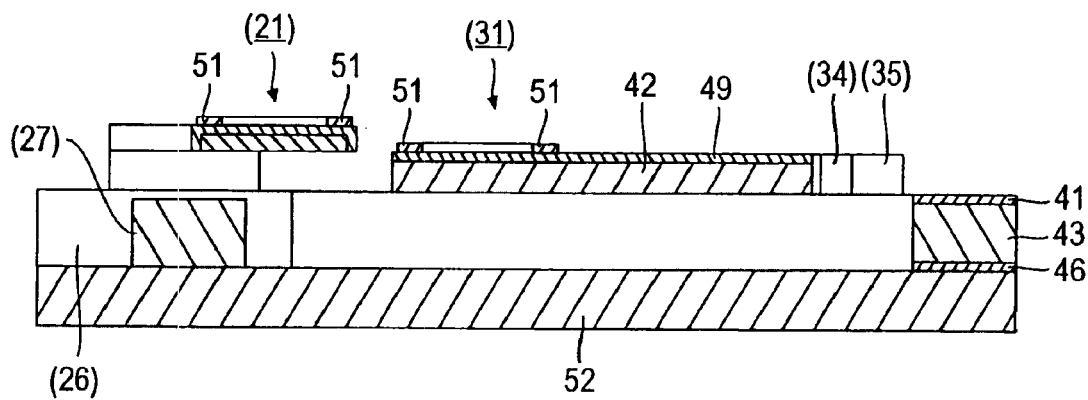
Figure 9:
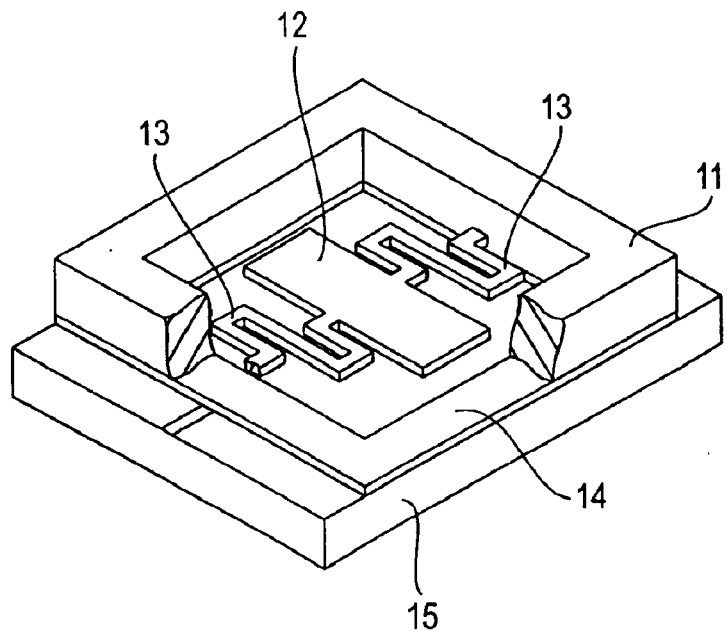
FIG. 9 is a perspective view illustrating an example of the prior art magnetic actuator in which the movable board is pivotally supported by torsion hinges.
Figure 10:
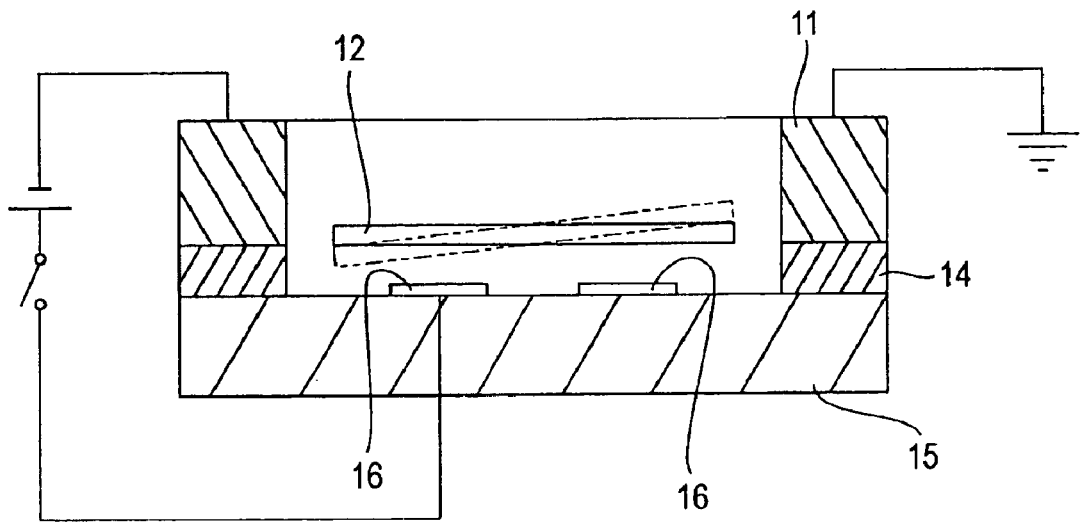
FIG. 10 is a cross-sectional view of the prior art magnetic actuator shown in FIG. 9.

Next, a method of manufacturing the magnetic actuator shown in FIG. 1 utilizing micromachining technique will be described step by step with reference to FIGS. 8A–8C which illustrate cross-sectional views taken along the section Y—Y. Further, in the steps 13 and 14, in order to show that the various layers function as the component parts of the apparatus illustrated in FIG. 1, the reference numerals for those layers are accompanied with the parenthesized reference numerals for the corresponding component parts.

Step (1): A multi-layered SOI substrate 44 comprising a silicon dioxide layer 41 and silicon layers 42 and 43 disposed on the opposite surfaces of the layer 41 is prepared.

Step (2): The SOI substrate 44 is subjected to heat oxidation to form silicon dioxide layers 45 and 46 on the top and bottom surfaces of the substrate.

Step (3): A polysilicon layer 47 is formed on the silicon dioxide layer 45 on the top side of the substrate by film forming process using a CVD (chemical-vapor deposition) apparatus, for example.

Step (4): A silicon dioxide layer 48 is formed on the polysilicon layer 47 by film forming process using a CVD apparatus, for example.

Step (5): A pattern of the substrate, torsion hinges and pedestals of the pivotally movable member is formed on the silicon dioxide layer 48 by photolithography, and then the silicon dioxide layer 48 is etched in accordance with that pattern by RIE (reactive ion etching) apparatus, for example.

Step (6): The polysilicon layer 47 is etched as by RIE apparatus with the pattern of the silicon dioxide layer 48 as a mask.

Step (7): The silicon dioxide layers 45, 48 on the top side are removed as by RIE apparatus, followed by again forming a silicon dioxide layer 49 on the polysilicon layer 47 and the silicon layer 42 by film forming process using a CVD apparatus, for example.

Step (8): A pattern of the substrate of the movable member, support beams, base portions of the support beams, movable comb electrodes, fixed comb electrodes and lower pedestal parts of the pedestals of the torsion hinges is formed on the silicon dioxide layer 49 by photolithography, and then the silicon dioxide layer 49 is etched in accordance with that pattern as by RIE apparatus, for example.

Step (9): The silicon dioxide layer 42 is etched as by RIE apparatus with the pattern of the silicon dioxide layer 49 as a mask. Then, a ferromagnetic layer 51 such as nickel is formed on the top surface as by spattering apparatus.

Step (10): A pattern of the frames of the ferromagnetic layer for the pivotally movable member and for the movable member is formed on the ferromagnetic layer 51 by photolithography, followed by etching the ferromagnetic layer in accordance with that pattern as by milling.

Step (11): A pattern for providing a space for accommodating the permanent magnet below the pivotally movable member is formed on the silicon dioxide layer 46 on the bottom side by photolithography, and then the silicon dioxide layer 46 is etched in accordance with that pattern, followed by etching the silicon layer 43 with the pattern of the silicon dioxide layer 46 as a mask.

Step (12): A pattern of the base is formed on the silicon dioxide layer 46 on the bottom side by photolithography, and then the silicon dioxide layer 46 is etched in accordance with that pattern while at the same time the silicon dioxide layer 41 exposed on the back side of the movable member portion is removed by etching.

Step (13): The silicon layer 43 on the back side of the movable member (31) and the silicon layer 42 on the back side of the pivotally movable member (21) are etched from the back side as by RIE apparatus with the pattern of the silicon dioxide layer 46 as a mask. Then, the silicon dioxide layer 41 for the movable member 31 and the silicon dioxide layers 45, 49 are etched. Thus, the structure of the magnetic actuator as shown in FIG. 1 without the permanent magnet 27 is produced by the steps described so far.

Step (14): A lower support plate 52 is prepared and the base 16 is mounted on and secured to the lower support plate 52. In addition, the permanent magnet 27 is mounted on and secured to the lower support plate 52 at such a position that the magnet is positioned in the space underneath the pivotally movable member 21. By the foregoing process, the production of the magnetic actuator as shown in FIG. 1 is completed. Preferably, the material of which the lower support plate 52 is made may be metal or semiconductor such as silicon in order to prevent malfunction of the actuator due to static electricity.

While the pivotally movable member 21 and the movable member 31 are both rendered ferromagnetic by forming ferromagnetic films 23 and 33 on the surfaces of the substrates 22 and 32, respectively in the embodiment described above, it is to be understood that the pivotally movable member 21 and the movable member 31 may be configured to be made entirely of ferromagnetic material.

Further, as explained with reference to the ferromagnet bar A in FIG. 4 and as also shown in FIG. 1, the pivotally movable member 21 is at a position pivoted for a predetermined angle even in its initial position in which it is subject to no repulsive force as the movable member 31 is retracted away from the pivotally movable member. However, the angle of the pivotally movable member 21 in its initial position may be adjusted to a horizontal position, for example by adding an appropriate mass by a resist or metal on the free end of the pivotally movable member 21 opposite from the supported end at which it is supported by the torsion hinges 24.

As discussed hereinabove, the magnetic actuator according to this invention is capable of providing a large angle of actuation with a relatively low driving voltage.

In addition, since no voltage is applied to the pivotally movable member 21 which is to be pivotally movably driven, there is no occurrence of failure in operation due to displacement of the charge in the pivotally movable member, whereby a highly reliable magnetic actuator may be obtained.

What is claimed is:

1. A magnetic actuator comprising:
    a permanent magnet;
    a pivotally movable member located at an oblique magnetic field position offset in a direction parallel to a top surface of the permanent magnet by a predetermined horizontal distance from the center of said permanent magnet and spaced a predetermined vertical distance upwardly from the top surface of the permanent magnet within a magnetic field generated by said permanent magnet;
    torsion hinge means pivotally movably supporting said pivotally movable member at its one end portion adjacent the center of said permanent magnet;
    a movable member; and
    drive means for driving said movable member;
    wherein
        said movable member is driven from a direction orthogonal to a pivot axis defined by said torsion hinge means towards the torsion hinge means by said drive means to be brought in a space between said permanent magnet and said pivotally movable member; and
        said pivotally movable member and said movable member are ferromagnetic;
    whereby said pivotally movable member is caused to pivot by a repulsive force produced between the pivotally movable member and said movable member as the movable member is driven to move nearer to said pivotally movable member.

2. The magnetic actuator set forth in claim 1 wherein each of said pivotally movable member and said movable member comprises a substrate and a ferromagnetic film formed on the surface of the substrate.

3. The magnetic actuator set forth in claim 2 wherein said ferromagnetic film is formed in the form of a frame on the surface of the substrate.

4. The magnetic actuator set forth in claim 3 wherein said ferromagnetic film in the form of a frame has its frame interrupted at one place.

5. The magnetic actuator set forth in claim 1 wherein said drive means is an electrostatic actuator comprising movable comb electrode means and fixed comb electrode means disposed opposite to each other.

* * * * *